United States Patent [19]

Tiegs et al.

[11] Patent Number: 5,456,877
[45] Date of Patent: Oct. 10, 1995

[54] METHOD OF PREPARING A HIGH SOLIDS CONTENT, LOW VISCOSITY CERAMIC SLURRY

[75] Inventors: Terry N. Tiegs, Lenoir City, Tenn.; Dale E. Wittmer, Carbondale, Ill.

[73] Assignee: Martin Marietta Energy Systems, Inc., Oak Ridge, Tenn.

[21] Appl. No.: 206,989

[22] Filed: Mar. 4, 1994

[51] Int. Cl.$^6$ ............................ B22F 9/00; B22F 9/02
[52] U.S. Cl. .......................... 419/30; 264/5; 501/1
[58] Field of Search .................... 264/5; 501/1; 419/30

[56] References Cited

U.S. PATENT DOCUMENTS

| | | | |
|---|---|---|---|
| 3,075,710 | 1/1963 | Feld et al. | 241/16 |
| 4,906,424 | 3/1990 | Hughes et al. | 264/63 |
| 5,032,555 | 7/1991 | Yamanis et al. | 501/105 |
| 5,043,119 | 8/1991 | Liles et al. | 264/501 |
| 5,077,242 | 12/1991 | Nakamoto et al. | 501/95 |
| 5,266,243 | 11/1993 | Kneller et al. | 264/6 |
| 5,312,571 | 5/1994 | Pujari et al. | 264/13 |

OTHER PUBLICATIONS

M. H. Stancyzk and I. L. Feld, "Comminution By The Attrition Grinding Process", U.S. Bureau of Mines Bulletin 670, 1980.

D. E. Wittmer, "Use of Bureau of Mines Turbomill to Produce High–Purity Ultrafine Nonoxide Ceramic Powders", U.S. Bureau of Mines Report of Investigation 8854, 1983.

D. E. Wittmer, "Alternative Processing Through Turbomilling", Am. Ceram. Soc. Bull., 67[10] 1670–1672.

J. L. Hoyer, "Ultrafine Ceramic Powders Produced by Turbomilling", Am. Ceram. Soc. Bull, 67[10] 1663–1688 (1988).

S. Prochazka, "Attrition Milling of Hard Substances to Submicrometer Grain Size", pp. 311–320 in Advances in Ceramics, vol. 21, Ceramic Powder Science, G. L. Messing, K. S. Mazdiyashnik J. W. McCauley, and R. A. Haber (ed.), Am. Ceram. Soc., Westerville, Ohio (1987).

*Primary Examiner*—Donald P. Walsh
*Assistant Examiner*—Scott T. Bluni
*Attorney, Agent, or Firm*—Ivan L. Ericson; Joseph A. Marasco; Harold W. Adams

[57] ABSTRACT

A method for producing a high solids content, low viscosity ceramic slurry composition comprises turbomilling a dispersion of a ceramic powder in a liquid to form a slurry having a viscosity less than 100 centipoise and a solids content equal to or greater than 48 volume percent.

2 Claims, No Drawings

METHOD OF PREPARING A HIGH SOLIDS CONTENT, LOW VISCOSITY CERAMIC SLURRY

This invention was made with Government support under contract DE-AC05-84OR21400 awarded by the U.S. Department of Energy to Martin Marietta Energy Systems, Inc. and the Government has certain rights in this Invention.

FIELD OF THE INVENTION

The present invention relates to a method of preparing a ceramic slurry composition, more particularly, to a method of preparing a high solids content, low viscosity ceramic slurry composition.

BACKGROUND OF THE INVENTION

At the present time, gel-casting has shown the ability to fabricate complex shaped articles, but because of high slurry viscosities at high solids contents, de-airing is insufficient and defects are introduced into the parts. This has been observed in silicon nitride materials.

As the solids contents of a slurry increases, the viscosity also increases. This behavior is more a problem with small or fine particle sizes. For fabrication techniques, such as gel-casting, it is desirable to process at high solids contents to obtain parts with as high of green densities as possible, Green densities of $\geq 48\%$ are considered a minimum necessary for adequate sintering. With fine powders used in current advanced ceramics ($<1$ µm diameter) and using conventional dispersion techniques, such as ball milling, the slurries typically have very high viscosities ($>100$ cP) and are difficult to de-air at solids loadings $>40$ volume %. Consequently, these slurries contain large numbers of bubbles that are retained in the gel-cast part as voids and end up as defects or flaws in the final piece. At solids contents approaching 50 volume %, the slurries become unpourable and thus cannot even be gel-cast.

OBJECTS OF THE INVENTION

Accordingly, it is an object of the present invention to provide a new and improved method of producing a high solids content, low viscosity ceramic slurry composition.

Further and other objects of the present invention will become apparent from the description contained herein.

SUMMARY OF THE INVENTION

In accordance with one aspect of the present invention, a new and improved method of producing a high solids content, low viscosity ceramic slurry composition comprises the following steps:

Step 1—A ceramic powder dispersed in a liquid to form a dispersion having a solids content equal to or greater than 48 volume percent is provided.

Step 2—The dispersion of step 1 is comminuted for a period of time sufficient to form a slurry having a viscosity less than 100 centipoise and a solids content equal to or greater than 48 volume percent.

DETAILED DESCRIPTION OF THE PREFERRED EMBODIMENTS

Turbomilling is a well documented and patented method for grinding of ceramic powders. However, it has not been recognized as a method to disperse fine powders and produce slurries having high solids content and low viscosity. The following examples show the utility of using a turbomill in this matter.

Example 1—660 g $Si_3N_4$ Powder (0.2 µm diameter, Ube E-10) was mixed with 464 ml water and put into a turbomill (10 cm diameter) along with 1 Kg of zirconia mill media (~3 mm diameter). An additional 660 g $Si_3N_4$, 45 g $Al_2O_3$ (0.5 µm diameter, Ceralox HPA), and 135 g $Y_2O_3$ (1 µm diameter, Research Chemicals) were added with the mill at <800 rpm. 45 g of polyvinylpyrrolidone (PVP-K15, GAF Corp.) and 25 ml Darvan 821A (R. T. Vanderbilt) were also added as dispersants. The slurry contained 50 volume % solids and was turbomilled at 1400 rpm for 1 hour. The slurry was very fluid with a viscosity <50 cP.

Example 2—310 g $Si_3N_4$ powder (0.2 µm diameter, Ube E-10) and 396 g $Si_3N_4$ powder (1.5 µm diameter, Ube E-3) were mixed with 464 ml water and put into the turbomill (120 cm diameter) along with 1 Kg of zirconia mill media (~3 mm diameter). An additional 614 g $Si_3N_4$ (0.2 µm diameter, Ube E-10), 45 g $Al_2O_{3\ 10}$)(0.5 µm diameter, Ceralox HPA), and 135 g $Y_2O_{3\ 10}$)(1 µm diameter, Research Chemicals) were added with the mill at 600–1000 rpm. 30 g of polyvinylpyrrolidone (PVP-15, a trademark of GAF Corp.) and 25 ml of ammonium polyacrylate (Darvan 821A, a trademark of R. T. Vanderbilt) were also added as dispersants. The slurry contained 49 volume % solids and was turbomilled at 1500 rpm for 2 hour. The slurry was very fluid with a viscosity less than 50 cP.

Example 3—920 g $Si_2N_4$ powder (0.1 µm diameter, Stark LC-12SX), 20 g $Al_2O_3$ (0.5 µm diameter, Ceralox HPA) and 60g $Y_2O_3$ (1 µm diameter 5600, a trademark of Molycorp, Inc.) were added to the turbomill (10 cm diameter) containing 528 ml water, 15 ml ammonium polyacrylate (Darvan 821A, a trademark of R. T. Vanderbilt), 15 g polyvinyl alcohol (Polyscience 25K, a trademark of Polysciences, Inc.), and 2 Kg of zirconia mill media (~3 mm diameter) at ~1000 rpm. The mixture was turbomilled for ~1 hour at 1000–1400 rpm. 460 g Si (3 µm diameter, Elkem HQ) were added with the mill at 600–1000 rpm. The slurry contained 49 volume % solids and was turbomilled at 1200 rpm for 0.5 hour. The slurry was very fluid with a viscosity <50 cP.

Example 4—The same quantities of powders and water as in example 1 were added to a conventional ball mill and tumbled at ~60 rpm for 4 hours. At higher rpm no milling action occurs because the media is held against the mill wall. The mixture was paste-like and was not pourable.

This method can be used to increase the solids contents of slurries with particle sizes >1 µm and lower their viscosities for improved de-airing.

This method can be used in combination with gel-casting technology to produce slurries with high solids contents and low viscosities. The result would be slurries that could be de-aired easily and would yield defect free, high strength materials. It would also result in green bodies of higher density than is currently obtained.

While there has been shown and described what is at present considered the preferred embodiments of the invention, it will be obvious to those skilled in the art that various changes and modifications may be made therein without departing from the scope of the invention as defined by the appended claims.

What is claimed is:

1. A method of producing a high solids content, low viscosity ceramic slurry comprising the following steps:

Step 1—providing a ceramic powder in a liquid to form a slurry having a solids content equal to or greater than 48 volume percent;

Step 2—dispersing by turbomilling in a turbomill said slurry of step 1 for a period of time sufficient to form a slurry having a viscosity less than 100 centipoise and a solids content equal to or greater than 48 volume percent.

2. A method of producing a high solids content, low viscosity ceramic slurry in accordance with claim 1 wherein said liquid in Step 1 comprises water and a dispersant selected from the group consisting of polyvinylpyrrolidone, ammonium polyacrylite, and mixtures thereof.

* * * * *